(12) United States Patent
Majlof et al.

(10) Patent No.: US 10,592,793 B2
(45) Date of Patent: Mar. 17, 2020

(54) SAMPLE CONTAINERS HAVING IDENTIFICATION MARKS EMBEDDED THEREIN AND BEING ADAPTED FOR ACOUSTIC EJECTIONS

(71) Applicant: LABCYTE INC., Sunnyvale, CA (US)

(72) Inventors: Lars Majlof, Saratoga, CA (US); Richard N. Ellson, Palo Alto, CA (US)

(73) Assignee: Labcyte Inc., San Jose, CA (US)

( * ) Notice: Subject to any disclaimer, the term of this patent is extended or adjusted under 35 U.S.C. 154(b) by 0 days.

(21) Appl. No.: 14/595,073

(22) Filed: Jan. 12, 2015

(65) Prior Publication Data

US 2015/0197372 A1 Jul. 16, 2015

Related U.S. Application Data

(60) Provisional application No. 61/927,395, filed on Jan. 14, 2014.

(51) Int. Cl.
  *G06K 19/06* (2006.01)
  *B01L 3/00* (2006.01)
  *G06K 1/12* (2006.01)

(52) U.S. Cl.
  CPC ........ *G06K 19/06037* (2013.01); *B01L 3/508* (2013.01); *G06K 1/128* (2013.01); *G06K 19/06028* (2013.01); *G06K 19/06121* (2013.01); *G06K 19/06159* (2013.01); *B01L 2300/021* (2013.01); *B01L 2300/0832* (2013.01); *B01L 2300/0841* (2013.01); *B01L 2300/0858* (2013.01); *B01L 2400/0439* (2013.01)

(58) Field of Classification Search
  CPC ............ B01L 2300/021; B01L 3/5453; G06K 7/10861
  USPC ..................................... 235/462.01
  See application file for complete search history.

(56) References Cited

U.S. PATENT DOCUMENTS 4,308,547 A 12/1981 Lovelady et al.
5,690,246 A * 11/1997 Anderson ........... B01L 3/50825
                                                206/446
(Continued)

FOREIGN PATENT DOCUMENTS

DE    10 2013 20696 7        11/2014
DE    102013206967 A1 *  11/2014  ........... G09F 3/0297
(Continued)

OTHER PUBLICATIONS

U.S. Appl. No. 61/927,878, dated Jan. 15, 2014, Ellson.
(Continued)

*Primary Examiner* — Thien M Le
*Assistant Examiner* — Tae W Kim
(74) *Attorney, Agent, or Firm* — Faegre Drinker Biddle & Reath LLP

(57) ABSTRACT

A container may include a tubular sidewall defining interior and exterior surfaces of the container, and including first and second regions disposed relative to one another along a major axis of the tubular sidewall. The container further may include an identification mark embedded within the tubular sidewall at a plurality of sectors about the tubular sidewall within the first region. Each sector may have a width, and the identification mark is machine readable by a reader viewing any arbitrary one or more of the sectors. An exemplary method for preparing such a container is also provided.

1 Claim, 9 Drawing Sheets

(56) References Cited

U.S. PATENT DOCUMENTS

| | | | | |
|---|---|---|---|---|
| 5,821,524 | A * | 10/1998 | Horlbeck | B01J 19/0046 235/482 |
| 5,897,839 | A * | 4/1999 | Jackson | B01L 9/06 206/443 |
| 6,938,995 | B2 | 9/2005 | Mutz et al. | |
| 7,293,715 | B2 * | 11/2007 | Bargach | B01L 3/545 235/375 |
| 7,849,620 | B2 | 12/2010 | Hussey et al. | |
| 7,900,505 | B2 | 3/2011 | Mutz et al. | |
| 8,292,182 | B1 | 10/2012 | Peng et al. | |
| 2002/0129525 | A1 * | 9/2002 | Kissinger | B65C 3/02 40/638 |
| 2003/0048341 | A1 * | 3/2003 | Mutz | B01J 19/0046 506/12 |
| 2005/0106619 | A1 * | 5/2005 | Bierre | B01L 3/5453 435/6.11 |
| 2008/0121688 | A1 * | 5/2008 | Harrop | G06K 19/06028 235/375 |
| 2009/0028754 | A1 | 1/2009 | Robb | |
| 2010/0078480 | A1 | 4/2010 | Aker | |
| 2013/0109042 | A1 * | 5/2013 | Ellson | B01L 3/50215 435/23 |
| 2013/0306732 | A1 * | 11/2013 | Berssen | G01N 35/00732 235/462.08 |
| 2015/0196904 | A1 | 7/2015 | Ellson | |

FOREIGN PATENT DOCUMENTS

| | | |
|---|---|---|
| EP | 1 348 485 | 10/2003 |
| EP | 2 070 012 | 6/2009 |
| EP | 2 289 625 | 3/2011 |
| JP | H08 166765 | 6/1996 |
| WO | WO 2013/116661 | 8/2013 |

OTHER PUBLICATIONS

U.S. Appl. No. 14/595,063, dated Jan. 12, 2015, Ellson.
International Search Report for PCT/US2015/010980 dated Jun. 29, 2015 (6 pages).
Written Opinion of the International Searching Authority for PCT/US2015/010980 dated Jun. 29, 2015 (11 pages).

* cited by examiner

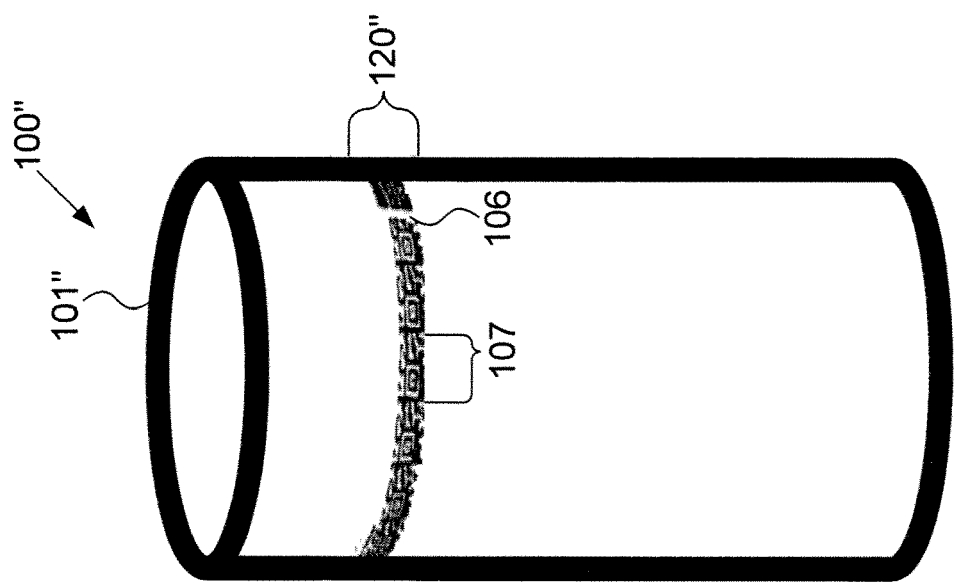
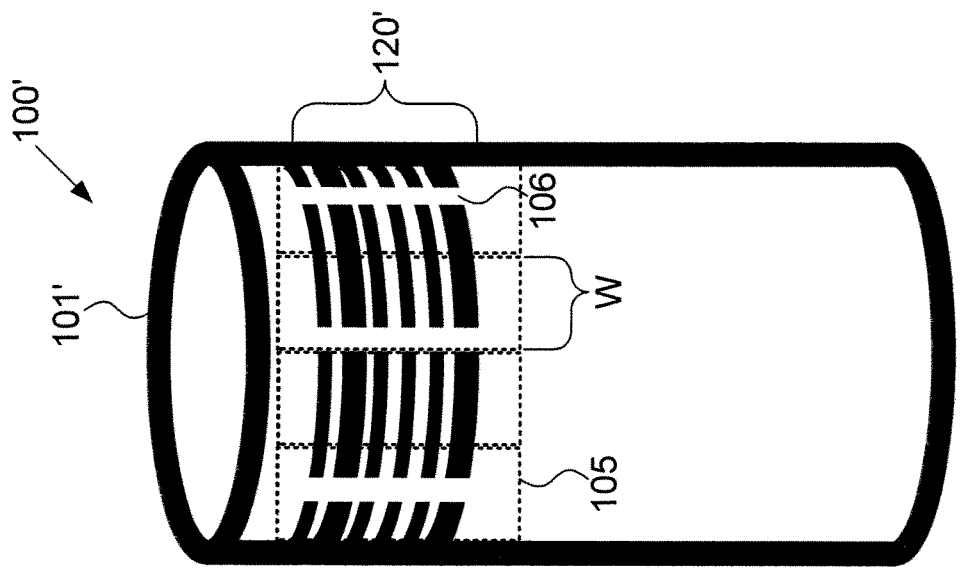
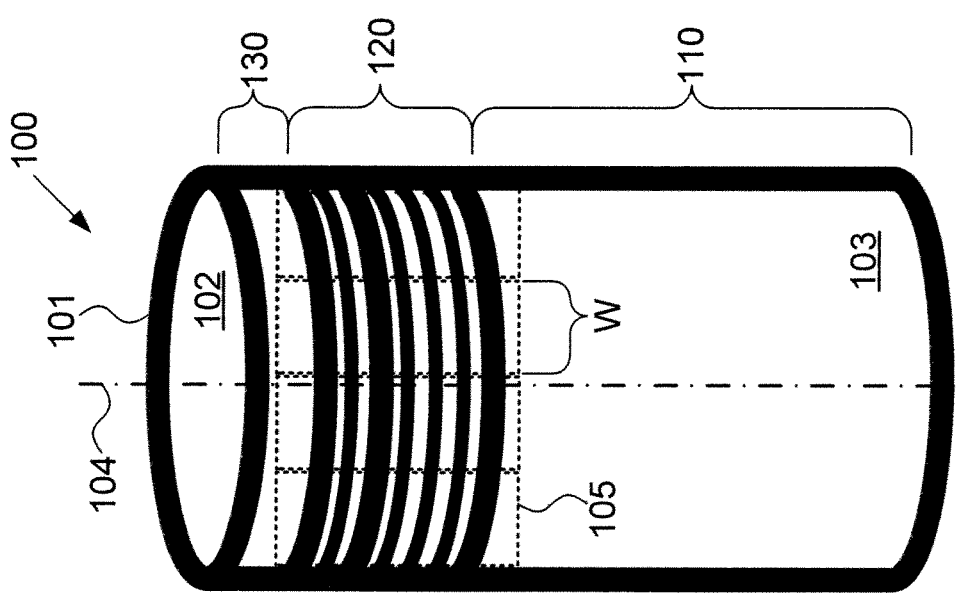

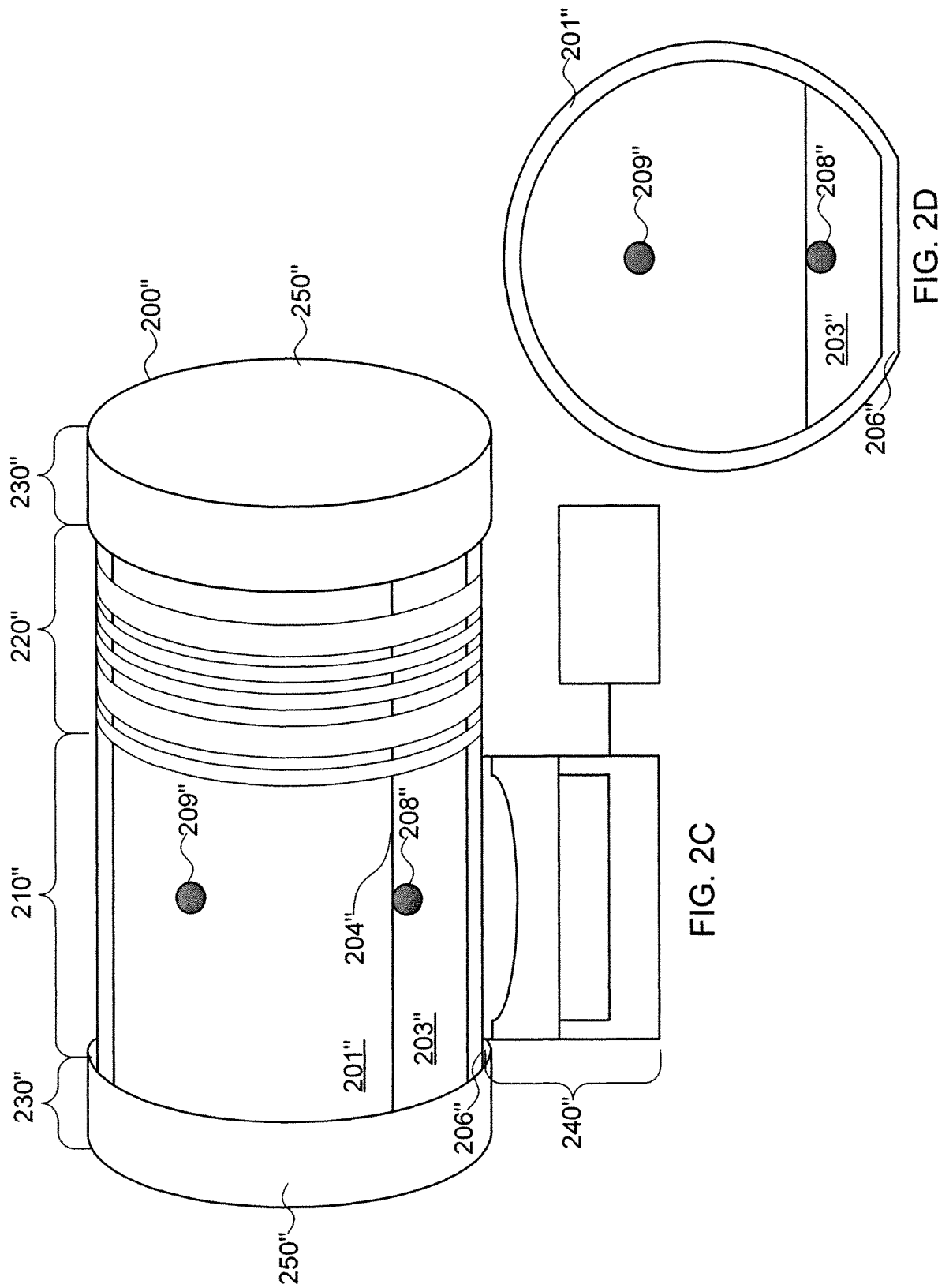

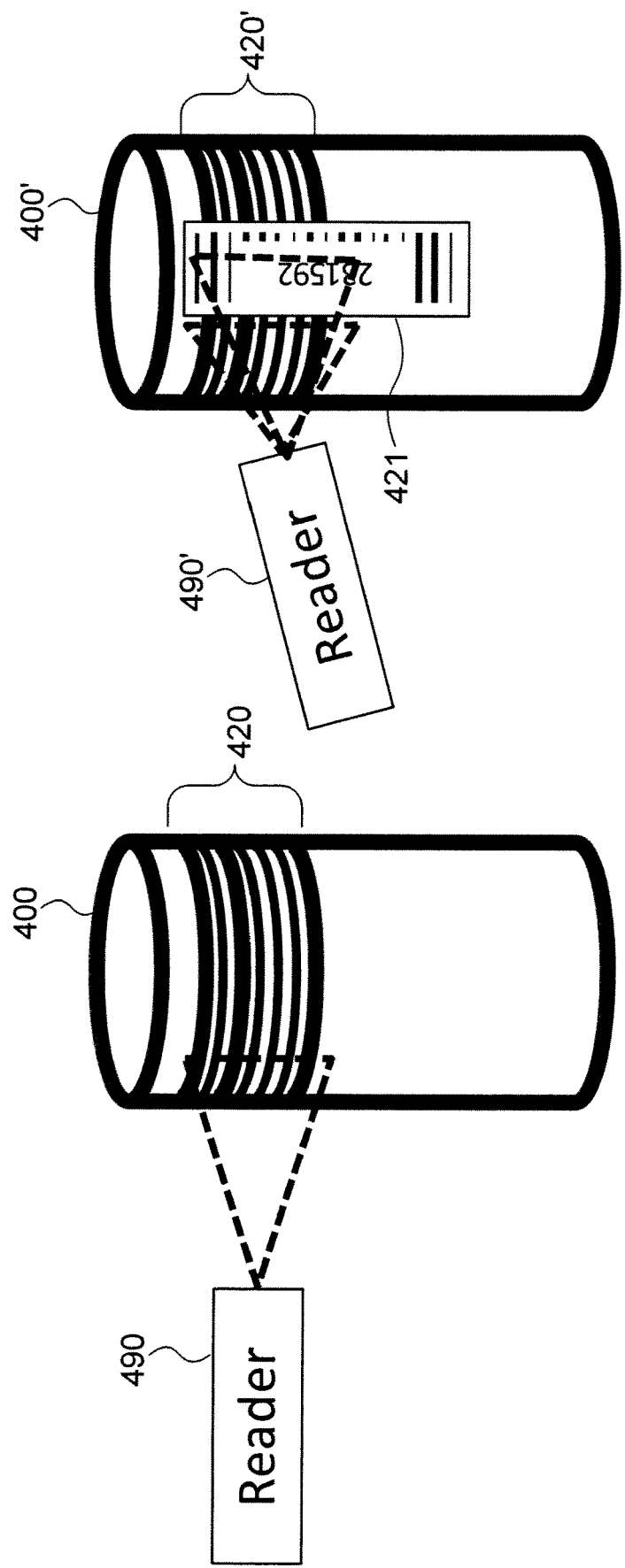

SAMPLE CONTAINERS HAVING IDENTIFICATION MARKS EMBEDDED THEREIN AND BEING ADAPTED FOR ACOUSTIC EJECTIONS

CROSS-REFERENCE TO RELATED APPLICATIONS

This application claims the benefit of U.S. Provisional Patent Application No. 61/927,395, filed on Jan. 14, 2014, the entire contents of which are incorporated by reference herein.

BACKGROUND OF THE INVENTION

The present invention is directed to sample handling. More particularly, certain embodiments of the present invention provide sample containers adapted for acoustic ejections and analyses and methods thereof as well as compatibility with identification of the container. Merely by way of example, the invention has been applied to a biological sample container with an identification mark, such as a barcode, that is embedded within the container, that identifies the container, and that can be viewed from many different points around the container, with each viewing resulting in identification of the container. But it would be recognized that the invention has a much broader range of applicability, such as storing a fluid sample, or any other item or material, within an identifiable container.

It is often desired to take a chemical or biological sample (e.g., a human blood sample) contained in an individual container and to transfer it to one or more well plates or other objects appropriate for carrying out reactions and assays such as in high-throughput screening for drug discovery or in clinical diagnostics in automated clinical chemistry analyzers. An important feature for the handling of samples includes the ability to transfer small volumes from the container to enable various types of diagnostics that can benefit from consistent deliveries of small-volume samples and to be able to repeatedly extract sample from the same container without potential for confusion of the identity of the sample container.

Acoustic ejection has been known for a number of years as a way of performing transfers of samples from containers, including microplates and microtubes. For example, in a typical setup for acoustic ejection, a piezoelectric transducer is driven by a waveform chosen by a controller and in response generates acoustic energy. The acoustic energy often is focused by an acoustic lens, and coupled to a reservoir or container containing fluid through an acoustic coupling medium (e.g., water). If the focused energy has a focal point inside a fluid in the container and close to a free surface of that fluid, a droplet may be ejected. Droplet size and velocity can be controlled by the chosen waveform as mentioned above.

In some embodiments, the transducer is movable in one or more directions (e.g., in the "z direction") that is roughly perpendicular to the free surface of the fluid. The movement can take place under the control of the controller. Some acoustic instruments for high-throughput use rely on an active control of the transducer position relative to the container and address the multiplicity of reservoirs in microplates or to an individual tube or to a tube in a rack of tubes. Often, the adjustment of the transducer position involves sending a motion command to a motion controller which then initiates movement in one or more directions (e.g., along one or more axes). For example, motion in the horizontal plane (e.g., in the "x direction" and/or in the "y direction") aligns the transducer with the selected reservoir, and motion in the vertical direction (e.g., in the "z direction") is used both to audit the reservoir and to focus for droplet transfer. In another example, positioning of the transducer to achieve the proper focus for droplet ejections can be responsive to data collected from an acoustic audit. Additionally, U.S. Pat. Nos. 6,938,995 and 7,900,505 are incorporated by reference herein for all purposes. When the motion is complete, the controller can notify the system that the transducer and the selected reservoir are now in the proper position for the next step in the process. This may be further measurement of the fluid in the reservoir and/or acoustic ejection of droplets. When completed, the first reservoir is removed, and the acoustic coupling with a second reservoir may take place. Coupling fluid may remain attached to the first reservoir and would typically be at the surface facing the transducer.

Containers may include one or more fluid reservoirs. For example, a container may include one reservoir such as individual tubes, or may include a rack of separable tubes, or may include a microplate having non-separable wells. Paper-based, adhesive labels having barcodes printed thereon are a common identifier for each of these containers and are well known in the art for both tube and microplate identification. Typically, for larger tubes, the barcode label is affixed to the outer surface of the cylindrical wall or to the bottom of the tube, whereas smaller tubes may not be labeled, but instead may be placed into a known location within a microplate or rack having a barcode label affixed thereto, e.g., applied to one or more of the exterior side surfaces. RFID tags have also been used, yet are not as common. In some cases, this is due to cost of tags and readers, and amongst others, it is the requirement to isolate a single item being read from its close neighbors.

As is known in the art, the specific region of the object having the barcode label affixed thereto must be presented to a barcode reader for proper identification to take place. However, problems may arise if the carrier, a label, another object, or the orientation of the object occludes the reader from viewing all or a portion of the complete barcode label, marking, or other identifier.

SUMMARY OF THE INVENTION

The present invention is directed to sample handling. More particularly, certain embodiments of the present invention provide sample containers adapted for acoustic ejections and analyses and methods thereof as well as compatibility with identification of the container. Merely by way of example, the invention has been applied to a biological sample container with an identification mark, such as a barcode, that is embedded within the container, that identifies the container, and that can be viewed from many different points around the container, with each viewing resulting in identification of the container. But it would be recognized that the invention has a much broader range of applicability, such as storing a fluid sample, or any other item or material, within an identifiable container.

For example, there is a need for individual sample containers with the advantages of being both compatible with acoustic ejection systems that are amenable to miniaturization and can in combination significantly simplify identification. In particular, it would be desirable for an identification mark reader, e.g., a barcode reader, to view the container identification even when the container in the proximity of many other similar containers (e.g., is racked) with minimal or no need for handling (e.g., rotating) the container to properly orient the container relative to the reader. In particular, it would be desirable for the container to be identifiable based on a non-specific (or non-predetermined), and relatively, small portion of its external surface, and for such identification to be repeatable at any time in a plurality of retrieval, open, close, and store cycles.

Accordingly, some embodiments of the present invention provide an individual, generally cylindrical container to include identification information that is written directly onto the container's exterior or interior cylindrical surface, e.g., engraved or embedded directly into such surface. Such identification information may, for example, include both an identification code such as a one-dimensional or two-dimensional bar code, and error correction information such as check bits known in the art, within a plurality of sectors about the internal or external circumference of the container. The sectors may be, but need not necessarily be, contiguous with one another, e.g., may be separated from one another by one or more blank areas, or by one or more paper-based labels applied to the container, or both. Preferably, the identification information is located on a portion of the interior or exterior surface of the container such that the identification information substantially does not interfere with the use of acoustic waves to eject one or more droplets of a fluid within the container.

Accordingly, under one non-limiting aspect of the present invention, a container includes a tubular sidewall defining interior and exterior surfaces of the container. The tubular sidewall includes first and second regions disposed relative to one another along a major axis of the tubular sidewall. The container further may include an identification mark embedded within the tubular sidewall at a plurality of sectors about the tubular sidewall within the first region. Each sector has a width, and the identification is machine readable by a reader viewing any arbitrary one or more of the sectors.

Under another non-limiting aspect of the present invention, a method for preparing a container includes providing a tubular sidewall defining interior and exterior surfaces of the container, the tubular sidewall having first and second regions disposed relative to one another along a major axis of the tubular sidewall. The method further may include embedding an identification mark within the tubular sidewall at a plurality of sectors about the tubular sidewall within the first region, each sector having a width, the identification mark being machine readable by a reader viewing any arbitrary one or more of the sectors.

BRIEF DESCRIPTION OF THE DRAWINGS

FIGS. 1A-1C are simplified diagrams showing sample containers having identification marks embedded therein, according to some embodiments of the present invention.

FIGS. 2A-2D are simplified diagrams showing sample containers having identification marks embedded therein together with an acoustic generator for acoustic ejection and/or analysis, according to some embodiments of the present invention.

FIGS. 4A-4C are simplified diagrams showing sample containers having identification marks embedded therein together with a reader for reading the identification marks, according to some embodiments of the present invention.

DETAILED DESCRIPTION

Figure 2A:
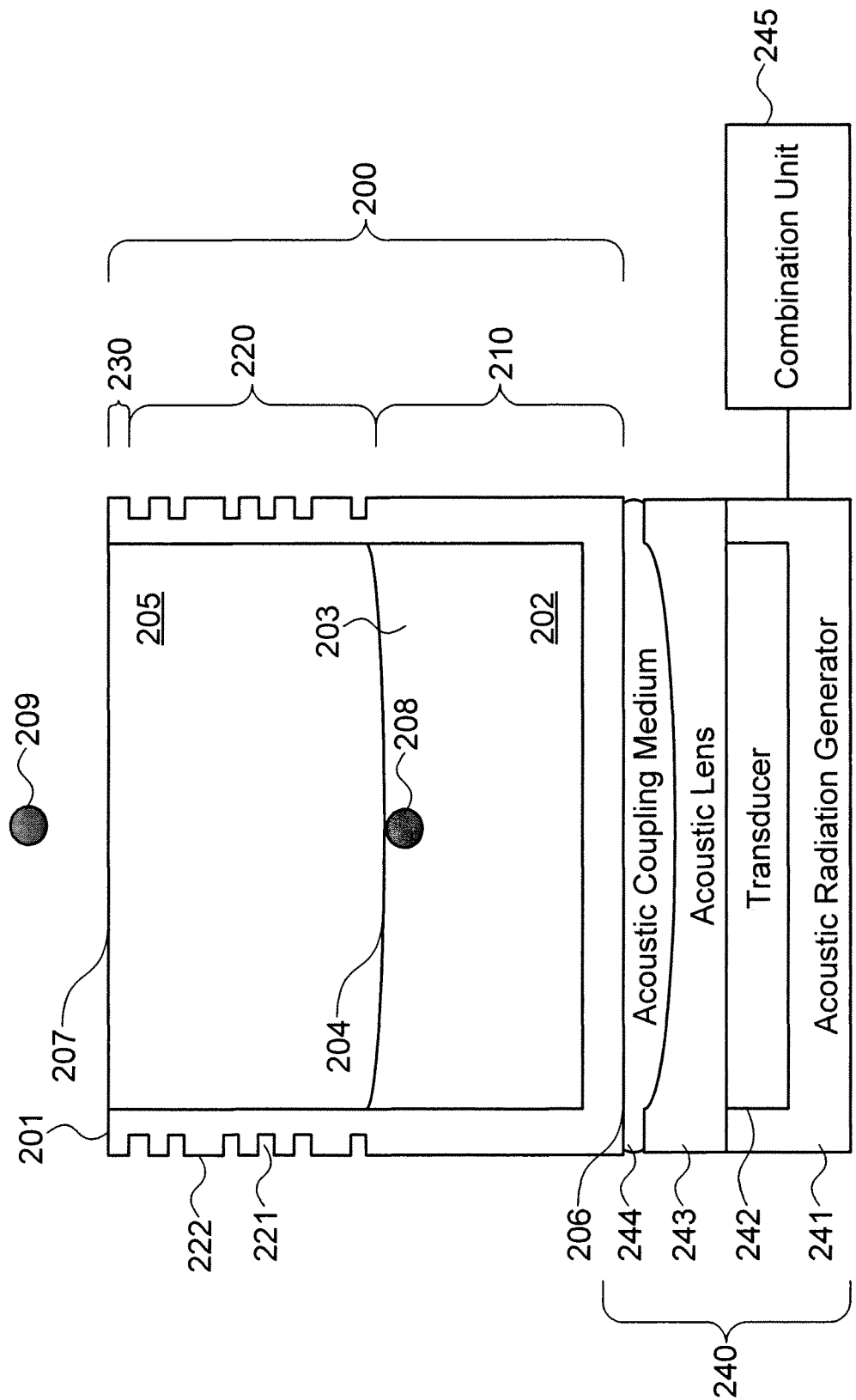

The present invention is directed to sample handling. More particularly, certain embodiments of the present invention provide sample containers adapted for acoustic ejections and analyses and methods thereof as well as compatibility with identification of the container. Merely by way of example, the invention has been applied to a biological sample container with an identification mark, such as a barcode, that is embedded within the container, that identifies the container, and that can be viewed from many different points around the container, with each viewing resulting in identification of the container. But it would be recognized that the invention has a much broader range of applicability, such as storing a fluid sample, or any other item or material, within an identifiable container.

With respect to various embodiments of the present invention, it is to be understood that this invention is not limited to specific solvents, materials, and/or device structures, as such may vary. It is also to be understood that the terminology used herein is for the purpose of describing particular embodiments only, and is not intended to be limiting.

According to some embodiments, the singular forms "a," "an," and "the" include both singular and plural referents unless the context clearly dictates otherwise. For example, reference to "a fluid" includes a plurality of fluids as well as a single fluid. In another example, reference to "a temperature" includes a plurality of temperatures as well as a single temperature.

According to certain embodiments, where a range of values is provided, it is intended that each intervening value between the upper limit and the lower limit of that range and any other stated or intervening value in that stated range is encompassed within the disclosure. For example, if a range of 1 μm to 8 μm is stated, it is intended that at least 2 μm, 3 μm, 4 μm, 5 μm, 6 μm, and 7 μm are also disclosed, as well as the range of values that are greater than or equal to 1 μm and less than or equal to 8 μm.

According to some embodiments, reference is sometimes made to "horizontal" or "vertical" in terms of acoustic ejection configuration where a fluid is in a sample container and has a free surface which is approximately horizontal (e.g., approximately perpendicular to the direction of the earth's gravity).

As discussed above, there is a need for sample containers that can simplify the full life cycle of processing biological samples (e.g., collecting, transferring, preserving, and/or analyzing biological samples) by using acoustic ejection and/or acoustic analysis, and that may include relatively durable identification marks.

For example, conventional collection containers (e.g., containers used in extraction and/or storage of samples) may include conventional identification marks, but usually are not adapted for use in acoustic transfer. Often, these conventional containers are tubular in geometry and have rounded bottoms to facilitate complete transfer out of the tube by pipettes. Curved container surfaces can alter the acoustic beam and pose additional challenges to aligning the beam with the container, analyzing the fluid in the container, and focusing the beam at the sample surface to enable acoustic ejection. Also, the conventional containers usually are not labeled in such a manner that is compatible with uniform propagation of the acoustic beam towards a free surface of the sample such that a droplet can be ejected out of the container. For example, certain conventional containers are roughly cylindrical tubes that have been molded in such a manner as to having a small nub or molding artifact directly opposite their open tops in the middle of the tube bottoms (e.g., where the plastic entered the mold during the manufacturing process). Such small nub or molding artifact can disrupt uniformity of sound entering at this location. In another example, some conventional tubes, in addition to having curved exterior walls, have exterior labels that are made of paper consisting of fibers that can scatter sound, or have adhesive layers containing air gaps that can disrupt uniform transfer of acoustic energy.

As described herein, embedding an identification mark within a container adapted for acoustic ejections may provide significant advantages relative to providing the identification mark on a paper label that subsequently is applied to a container. First, an embedded identification mark may be significantly more durable than may be a paper label. For example, conventional labels may include a sheet of paper upon which an identification mark may be printed, and may be affixed to the container using an adhesive. Such labels may be susceptible to degradation of the paper, or of the identification mark, and/or of the adhesive, particularly when the container is handled multiple times in a wet environment. In comparison, the present embedded identification marks may, for example, be formed by defining a plurality of grooves that in turn define the identification mark, e.g., by removing small amounts of material from the container or by otherwise introducing machine-readable changes in the texture of the container's surface in accordance with a geometrical pattern. Such grooves may be formed using any suitable method, including but not limited to laser scribing, chemical etching, discoloring the surface such as with heating, burning, or radiation, or transferring adherent materials which may have the same color as the container or may have one or more different colors than the container. As such, the embedded identification marks may be contiguous and unitary with the container, may have approximately the same mechanical, thermal, and optical properties as the container, and may be substantially unaffected by exposure to a fluid.

Moreover, the present embedded identification marks may be formed so as to have any desired area, and any desired feature size, that suitably may be provided using technologies available at the time of formation. For example, the identification marks may be formed using laser scribing, which presently may form features having sizes of 100 μm or less, e.g., 50 μm or less, or 25 μm or less, or 10 μm or less, or 5 μm or less, or 1 μm or less. Accordingly, the identification marks may have at least one lateral dimension that is 1 mm or less, or 500 μm or less, or 250 μm or less, or 100 μm or less, or 50 μm or less, or 10 μm or less. Features and labels of such sizes readily may be embedded within a sidewall and may be machine readable. In comparison, conventional labels may be manually applied to the exterior surfaces of containers and may be intended to be readable by humans, and accordingly may have feature sizes that are 1 mm or larger, or 10 mm or larger, or 100 mm or larger, and may have lateral dimensions that are 1 cm or larger, or 10 cm or larger.

Additionally, the identification mark embedded within the container preferably may be compatible with acoustic analysis of a fluid that may be disposed inside of the container. For example, the identification mark preferably is configured so as not to disrupt the uniform or efficient transfer of acoustic energy, which may be in the low megahertz range, through a wall or bottom of the container, into the fluid, and to a free surface of the fluid from which droplets will emerge in acoustic ejection. As such, in some embodiments, the identification mark may be embedded within the container in a region that is spaced apart from a region in which the fluid may be disposed and/or in which acoustic energy may be transmitted into and through the fluid. For example, in embodiments in which the sample container is oriented vertically and acoustic energy may be transmitted through the bottom of the container and into a fluid disposed within the bottom region of the container, the identification mark preferably is disposed within a region above the highest anticipated level of fluid within the container. Or, for example, in embodiments in which the sample container is oriented horizontally and acoustic energy may be transmitted through the side of the container and into a fluid disposed along the side of the container, the identification mark preferably is horizontally spaced apart from the region in which the acoustic energy is transmitted into the fluid. In comparison, applying a paper label to the region of the container at which acoustic energy is applied may lead to acoustic scattering from the presence of air gaps in the label or between the label and the container, scattering from paper fibers of the label, acoustic beam non-uniformity from surface texture of an identification mark printed on the label, absorption of acoustic energy by the materials of the label and identification mark (e.g., paper, plastics, or adhesives) and the like. Additionally, the presence of coupling fluid used in the acoustic analysis or ejection phase may also be present a problem with the reading method as the paper label may disrupt the read by occlusion, refraction, or reflection from the presence of coupling fluid on the markings; additionally, the coupling fluid may degrade the paper label, marking thereon, and/or adhesive used to affix the label to the container.

Accordingly, it may be appreciated that the present embedded identification marks may facilitate the reusability of sample containers multiple times in wet or otherwise harsh environments substantially without degradation of the identification marks, and may be compatible with acoustic ejection techniques and with machine reading of the identification marks. Preferably, the container with identification mark embedded therein may include one or more acoustic paths that are free of scattering and/or non-focusing objects (e.g., bubbles), and/or have low surface roughness and/or low attenuation.

FIGS. 1A-1C are simplified diagrams showing sample containers having identification marks embedded therein, according to some embodiments of the present invention. These diagrams are merely examples, as are the other diagrams herein, which should not unduly limit the scope of the claims. One of ordinary skill in the art would recognize many variations, alternatives, and modifications.

FIG. 1A illustrates a first exemplary container 100 that includes tubular sidewall 101. Sidewall 101 defines interior surface 102 and exterior surface 103 of container 100. In the illustrated embodiment, sidewall 101 is generally cylindrical, e.g., has a cross section that is generally circular. However, it should be appreciated that sidewall 101 suitably may have other geometries, e.g., may have a cross-section that is generally triangular, or that is generally rectangular, or that is generally square, or that is generally pentagonal, or that is generally hexagonal, or that has any suitable number of sides, and indeed may have any regular or irregular shape. Additionally, the cross-section of sidewall 101 may vary along major axis 104. For example, sidewall 101 may be tapered, e.g., such that the cross-section at one end of sidewall 101 may be smaller or larger than the cross-section at the other end of sidewall 101. For example, if sidewall 101 is formed using a mold, then such a taper may facilitate removal of sidewall 101 from the mold.

In the embodiment illustrated in FIG. 1A, sidewall 101 includes first region 110, second region 120, and third region 130 which are disposed relative to one another along major axis 104 of sidewall 101. First region 110 of sidewall 101 defines a volume configured to receive a fluid, e.g., a fluid into which acoustic energy may be transmitted so as to eject a droplet of fluid. An identification mark, such as a barcode, is embedded within sidewall 101 in second region 120. For example, the identification mark may be embedded within a plurality of sectors 105 about sidewall 101 within second region 120, and may be embedded within one or both of the interior and exterior surfaces 102, 103 of container 100. Region 130, which is optional, may be configured to receive a cap. Although FIG. 1A illustrates the identification mark as being disposed only within second region 120, it should be appreciated that alternatively the identification mark may be disposed within any desired one or more of first region 110, second region 120, and third region 130. For example, the identification mark may be disposed within both first region 110 and second region 120, or within both second region 120 and third region 130, and so on. In an exemplary embodiment, container 100 has a height of 1 cm or less, region 110 has a height of 0.5 cm or less, and region 120 has a height of 0.5 cm or less. In another exemplary embodiment, container 100 has a height of 100 mm or less, region 110 has a height of 50 mm or less, and region 120 has a height of 50 mm or less. In yet another exemplary embodiment, container 100 has a height of 60 mm or less, region 110 has a height of 30 mm or less, and region 120 has a height of 30 mm or less. In still another exemplary embodiment, container 100 has a height of 20 mm or less, region 110 has a height of 10 mm or less, and region 120 has a height of 10 mm or less. In still another exemplary embodiment, container 100 has a height of 1 mm or less, region 110 has a height of 500 µm or less, and region 120 has a height of 500 µm or less. It should be apparent that the present identification marks are compatible with larger or smaller sizes of containers 100, regions 110, and regions 120.

Preferably, the identification mark is located in a region that is visible to a reader and that substantially does not interfere with transmission of acoustic energy into and through a fluid that may be disposed within container 100. For example, as described in greater detail below with reference to FIGS. 4A-4C, the embedded identification mark preferably is machine readable by a reader viewing any arbitrary one or more of sectors 105 of second region 120 illustrated in FIG. 1A. For example, each of sectors 105 may have a width W that is between about 1% and about 50% of a circumference of the interior or exterior surface 102, 103 in which the identification mark is embedded, e.g., between about 5% and about 33%, or between about 5% and about 20%, or between about 5% and about 10%, e.g., about 10% or less of a circumference of the interior or exterior surface 102, 103 in which the identification mark is embedded. As described in greater detail below with reference to FIGS. 3A-3B, the identification marks may be formed using laser scribing, and as described below with reference to FIGS. 4A-4C, may be read using a laser reader. For example, the identification marks may include features having sizes of 100 µm or less, e.g., 50 µm or less, or 25 µm or less, or 10 µm or less, or 5 µm or less, or 1 µm or less, and may have at least one lateral dimension that is 1 mm or less, or 500 µm or less, or 250 µm or less, or 100 µm or less, or 50 µm or less, or 10 µm or less.

In the embodiment illustrated in FIG. 1A, the embedded identification mark includes a machine-readable change in a texture of the tubular sidewall 101 in accordance with a geometrical pattern, such as but not limited to a plurality of grooves defined in sidewall 101 within second region 120. As described in greater detail below with reference to FIGS. 3A-3B, the change in texture, e.g., grooves may be removing small amounts of material from the container or by otherwise introducing machine-readable changes in the texture of the container's surface in accordance with a geometrical pattern, e.g., using laser scribing, chemical etching, discoloring the surface such as with heating, burning, or radiation, or transferring adherent materials which may have the same color as the container or may have one or more different colors than the container.

As illustrated in FIG. 1A, the change in texture, e.g., grooves, may in some embodiments define a barcode, e.g., a one-dimensional barcode in which the grooves extend substantially perpendicularly to major axis 104 of sidewall 101. The change in texture, e.g., grooves may be substantially contiguous about sidewall 101, e.g., a plurality of sectors 105 may be contiguous with one another. Alternatively, the embedded identification mark may have one or more discontinuities. For example, FIG. 1B illustrates an alternative container 100' having a modified sidewall 101', in which the identification mark within modified region 120' includes a one-dimensional barcode analogous to that illustrated in FIG. 1A, but in which the change in texture, e.g., grooves, defining the barcode include one or more discontinuities 106 about sidewall 101. In some embodiments, discontinuities 106 have a width that is about 40% or less of the circumference of the surface in which the identification mark is embedded, e.g., about 20% or less of the circumference of the surface in which the identification mark is embedded, e.g., about 10% or less of the circumference of the surface in which the identification mark is embedded, e.g., about 5% or less of the circumference of the surface in which the identification mark is embedded, e.g., about 2% or less of the circumference of the surface in which the identification mark is embedded, e.g., about 1% or less of the circumference of the surface in which the identification mark is embedded. As described in greater detail with reference to FIG. 4B, such discontinuities 106 may include paper labels applied to the container, e.g., paper, human readable labels affixed to the outer surface of the container. Preferably, even if such a label or other discontinuity 106 partially or fully obscures one or more of sectors 105, the identification code in unobscured sectors 105 or portions thereof is machine readable by viewing any arbitrary one or more of such other, unobscured sectors 105 or portions thereof.

It should be apparent to those skilled in the art that the present embedded identification marks suitably may include any pattern or identification code presently known or yet to be developed. In one illustrative example, FIG. 1C illustrates another alternative container 100" having a modified sidewall 101", in which the identification mark within modified region 120" includes a two-dimensional barcode 107 that is repeated around substantially the entire circumference of the container, and one or more optional interruptions 106. In some embodiments, two-dimensional barcodes 107 have a width that is about 20% or less of the circumference of the surface in which the identification mark is embedded, e.g., about 10% or less of the circumference of the surface in which the identification mark is embedded, e.g., about 5% or less of the circumference of the surface in which the identification mark is embedded, e.g., about 2% or less of the circumference of the surface in which the identification mark is embedded, e.g., about 1% or less of the circumference of the surface in which the identification mark is embedded.

In preferred embodiments, the present embedded identification marks include any suitable geometric pattern, e.g., any suitable combination of symbols, dots, lines, spaces, curves, or other suitable patterns known in the art or yet to be developed. Such a geometric pattern suitably may be defined using a change in texture, e.g., a plurality of grooves that are defined in the inner surface of the sample container, the outer surface of the sample container, or both. In one illustrative example, the identification mark may include a change in texture, e.g., grooves, that have one or more characteristic that varies based on their radial position about the container, as a way of carrying information, such as color, width, depth, duty cycle, e.g., different kinds of dashed lines within a sector.

Examples of one-dimensional barcodes upon which the present identification marks suitably may be based include one or more of the following: Codabar, Code-25 (e.g., Interleaved 2 of 5 or Non-Interleaved 2 of 5), Code 11, Code 39, Code 93, Code 128, CPC binary, DUN 14, GS1-128, GS1 DataBar, Health Industry Bar Code (HIBC), ITF-14, JAN, MSI, Pharmacode, Plessey, and Universal Product Code (UPC, e.g., UPC-A, UPC-B, UPC-C, UPC-D, or UPC-E), among others. Examples of two-dimensional barcodes upon which the present identification marks suitably may be based include one or more of the following: 3-DI, ArrayTag, AugTag, Aztec code, Small Aztec Code, Codablock, Code 1, Code 16K, Code 49, Compact Matrix Code, CP Code, CyberCode, DataGlyphs, Data Matrix, Datastrip Code, Dot Code A, EZcode, Grid Matrix Code, HD Barcode, HueCode, INTACTA.CODE, Intercode, JAGTAG, MaxiCode, mCode, MiniCode, MicroPDF417, NexCode, Optar, PaperDisk, PDF417, PDMark, QR Code, QuickMark Code, SmartCode, Snowflake Code, ShotCode, SPARQCode, SuperCode, Trillcode, UltraCode, VeriCode, VSCode, and WaterCode, among others. Preferably, but not necessarily, the one-dimensional or two-dimensional barcode(s) selected for use in the present embedded identification marks include an error code, e.g., one or more check bits that facilitate a reader's confirmation that the identification mark was properly read. It should also be appreciated that identification marks other than barcodes suitably may be used, e.g., machine readable numbers, letters, or symbols, or any other suitable geometric pattern. Exemplary systems for reading identification marks such as barcodes are known in the art, and described in greater detail below with reference to FIGS. 4A-4C.

As noted above, the present embedded identification marks preferably are compatible with transmission of acoustic energy into and through a fluid that is disposed within the container. For example, FIGS. 2A-2D are simplified diagrams showing sample containers having identification marks embedded therein together with an acoustic generator for acoustic ejection and/or analysis, according to some embodiments of the present invention.

FIG. 2A illustrates an exemplary sample container 200 that is in a substantially vertical orientation and configured for use with acoustic generator 240. In the illustrated embodiment, sample container 200 includes tubular sidewall 201, which may be substantially cylindrical, and that includes a first region 230 defining a first volume 202 for receiving a fluid 203 having an upper surface 204, and second and third regions 220, 230 defining a second volume 205 for containing a gas disposed over upper surface 204. Third region 230 may be configured to receive a cap (not illustrated). An identification mark such as described herein is embedded within sidewall 201 within region 220, and preferably, but not necessarily, only within region 220. In the embodiment illustrated in FIG. 2A, the identification mark includes a change in texture, e.g., a plurality of grooves 221 defined within the exterior surface of container 200 so as to define a plurality of ridges 222 that are raised relative to grooves 221. Preferably, grooves 221 have a depth such that the identification mark defined by grooves 221 and ridges 222 is machine readable, and may have any suitable geometric pattern. For example, grooves 221 may have a depth on the order of 1 nm, or on the order of 10 nm, or on the order of 100 nm, or on the order of 1 mm.

In the embodiment illustrated in FIG. 2A, container 200 is preferably axially symmetrical, e.g., cylindrical, having sidewall 201 extending upward from container base 206 and terminating at opening 207, although other container shapes may be used. The material and thickness of container base 206 preferably is configured such that acoustic radiation may be transmitted therethrough and into the fluid contained within container 200. Preferably, but not necessarily, container base 206 is substantially flat, is oriented substantially perpendicular to the major axis of sidewall 201, and is configured to receive an acoustic wave and to transmit the acoustic wave to fluid 203 disposed within region 210. For example, container 200 may be coupled to an acoustic ejector 240 that includes an acoustic radiation generator 241 for generating acoustic radiation and an acoustic lens 243 for focusing the acoustic radiation at a focal point within fluid 203 from which a droplet is to be ejected, near surface 204. The acoustic radiation generator contains a transducer 242, e.g., a piezoelectric element, commonly shared by an analyzer. As shown, a combination unit 245 is provided that both serves as a controller and a component of an analyzer. Operating as a controller, the combination unit 245 provides the piezoelectric element 242 with electrical energy that is converted into mechanical and acoustic energy. Operating as a component of an analyzer, the combination unit receives and analyzes electrical signals from the transducer. The electrical signals are produced as a result of the absorption and conversion of mechanical and acoustic energy by the transducer.

As shown in FIG. 2A, acoustic lens 243 may include a single solid piece having a concave surface for focusing acoustic radiation, but the lens may be constructed in other ways such as known in the art. Acoustic ejector 240 is thus adapted to generate and focus acoustic radiation so as to eject a droplet of fluid from surface 204 when acoustically coupled to container 200, and thus to fluid 203. Acoustic radiation generator 241 and lens 243 may function as a single unit controlled by a single controller, or they may be independently controlled, depending on the desired performance of the device. Typically, single ejector designs are preferred over multiple ejector designs because accuracy of droplet placement and consistency in droplet size and velocity are more easily achieved with a single ejector.

There are also a number of ways to acoustically couple the ejector 240 to each individual reservoir and thus to the fluid therein. One such approach is through direct contact as is described, for example, in U.S. Pat. No. 4,308,547 to Lovelady et al., wherein a lens constructed from a hemispherical crystal having segmented electrodes is submerged in a fluid to be ejected. The aforementioned patent further discloses that the lens may be positioned at or below the surface of the fluid. However, this approach for acoustically coupling the lens to a fluid is undesirable when the ejector is used to eject different fluids in a plurality of containers or reservoirs, as repeated cleaning of the lens would be required in order to avoid cross-contamination. The cleaning process would necessarily lengthen the transition time between each droplet ejection event. In addition, in such a method, fluid would adhere to the ejector as it is removed from each container, wasting material that may be costly or rare.

Thus, one exemplary approach would be to acoustically couple the ejector to the container without contacting any portion of the ejector, e.g., lens 243, with any of the fluids to be ejected. To this end, ejector 240 suitably may be positioned in controlled and repeatable acoustic coupling with container 200 to eject droplets therefrom without submerging the ejector therein. This typically involves direct or indirect contact between the ejector and the external surface of the container, e.g., bottom surface 206. When direct contact (not illustrated) is used in order to acoustically couple ejector 240 to container 200, it is preferred that the direct contact is wholly conformal to ensure efficient acoustic energy transfer. That is, ejector 240 and the bottom surface 206 of container 200 should have corresponding surfaces adapted for mating contact. Thus, if acoustic coupling is achieved between ejector 240 and container 200 through acoustic lens 243, it is desirable that the surface profile of bottom surface 206 suitably corresponds to the surface profile of the lens (not illustrated in the embodiment of FIG. 2A).

Alternatively, acoustic coupling may be achieved between the ejector and each of the containers through indirect contact, such as illustrated in FIG. 2A. For example, acoustic coupling medium 244 may be placed between ejector 240 and base 206 of container 200, with the ejector and container located at a predetermined distance from each other. The acoustic coupling medium 244 may be an acoustic coupling fluid, preferably an acoustically homogeneous material in conformal contact with both acoustic lens 243 and base 206 of container 200. Preferably, acoustic coupling medium 244 is substantially free of material having different acoustic properties than the fluid medium itself. Furthermore, it is preferred that acoustic coupling medium 244 includes a material having acoustic properties, e.g., acoustic impedance, that facilitate the transmission of acoustic radiation from acoustic lens 243 to bottom surface 206 and into container 200 without significant attenuation in acoustic pressure and intensity. For example, as illustrated in FIG. 2A, acoustic coupling medium 244 may couple container 200 to acoustic lens 243, such that an acoustic wave generated by acoustic radiation generator 241 is directed by the lens 243 into the acoustic coupling medium 244 which then transmits the acoustic wave into the container 200. The acoustic wave preferably focuses to a focal point 208 near the surface 204 of fluid 203 in order to eject at least one droplet 209 of the fluid. For further details of exemplary acoustic ejection systems and uses thereof, see U.S. Pat. Nos. 6,938,995 and 7,900,505.

Figure 2B:
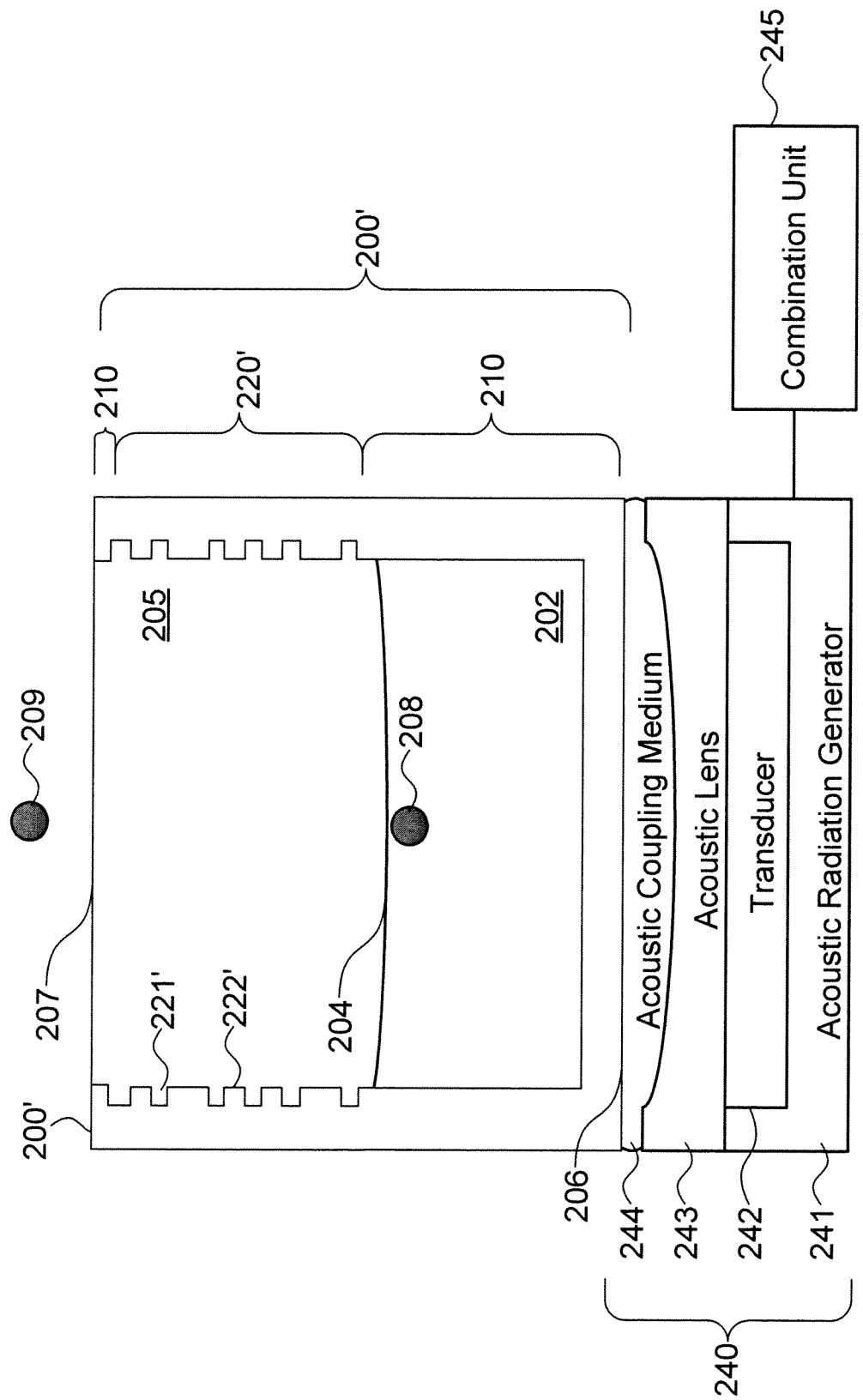

Note that many configurations and arrangements other than that illustrated in FIG. 2A suitably may be used. For example, FIG. 2B illustrates an embodiment in which an alternative container 200' is coupled to ejector 240 in a manner analogous to that illustrated in FIG. 2A. Alternative sidewall 201' of container 200' includes an alternative change in texture, e.g., plurality of alternative grooves 221', that are defined in the inner surface of container 200' within region 220'. Grooves 221' define regions 222' that are raised relative to grooves 221', and accordingly define an identification mark such as a barcode. In yet other embodiments (not illustrated), an identification mark suitably may be embedded on both sides of the inner and outer surface of a container.

FIGS. 2C-2D illustrate yet another embodiment, in which alternative container 200" is in a substantially horizontal orientation and configured for use with acoustic generator 240, which may be configured analogously to that described with reference to FIG. 2A but suitably adapted for use with horizontal container 200". In the illustrated embodiment, sample container 200" includes tubular sidewall 201", which may be substantially cylindrical, and that includes a first region 210" for performing acoustic ejection of fluid 203" having an upper surface 204", a second region 220" having embedded therein an identification mark such as described herein, and third regions 230" configured to receive caps 250". In the embodiment illustrated in FIGS. 2C-2D, the identification mark includes a change in texture, e.g., plurality of grooves, defined within the exterior surface of container 200" so as to define a plurality of ridges that are raised relative to the grooves, in a manner analogous to that illustrated in FIG. 2A. Alternatively, the identification mark may include a change in texture, e.g., plurality of grooves, defined within the interior surface of container 200" in a manner analogous to that illustrated in FIG. 2B, or as yet another alternative may include grooves defined within both the interior and exterior surfaces of container 200". Preferably, the identification mark, e.g., defined by the grooves and ridges, is machine readable, and may have any suitable geometric pattern.

In the embodiment illustrated in FIGS. 2C-2D, container 200" is generally cylindrical, although a portion of sidewall 201" in region 210", and optionally also in regions 220" and 230", is substantially flat along the major axis of sidewall 201". For example, FIG. 2D illustrates a cross-section of container 200" within region 210", in which it may be seen that bottom portion 206" is substantially flat, is oriented substantially perpendicular to the major axis of sidewall 201", and is configured to receive an acoustic wave and to transmit the acoustic wave to fluid 203" disposed within region 210". The material and thickness of bottom portion 206" should be such that acoustic radiation may be transmitted therethrough and into fluid 203" contained within container 200". For example, container 200" may be coupled to an acoustic ejector 240" that may be configured analogously to ejector 240 described above with reference to FIG. 2A, and adapted for use with container 200". For further details on containers and acoustic ejectors for use in a horizontal configuration, see U.S. Publication No. 2013/0109042, the entire contents of which are incorporated by reference herein for all purposes.

An exemplary method and system for preparing a sample container now will be described, although it should be understood that other methods and systems suitably may be used.

Figure 3A:
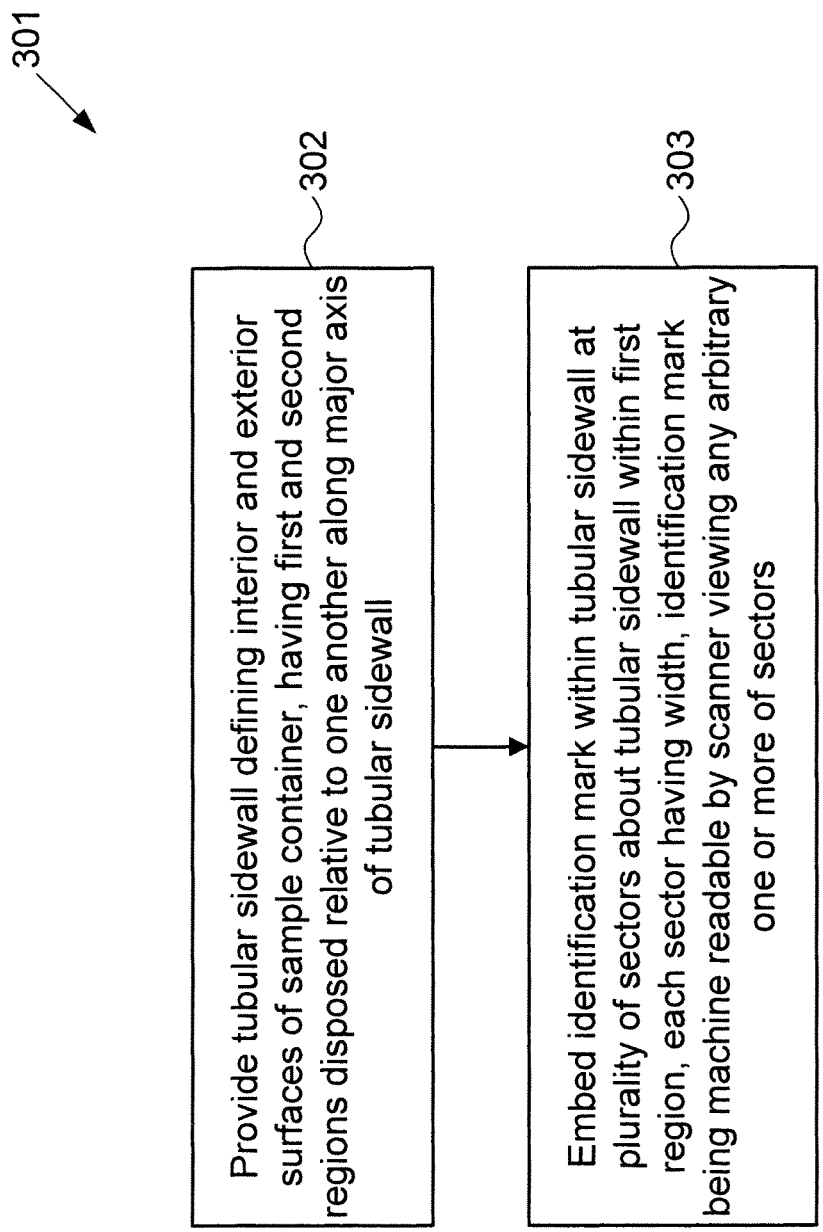
FIG. 3A illustrates steps in an exemplary method for preparing a sample container having an identification mark embedded therein, according to an embodiment of the present invention.

FIG. 3A illustrates an exemplary method 301 for preparing a sample container having an identification mark embedded therein, according to an embodiment of the present invention. Method 301 includes providing a tubular sidewall defining interior and exterior surfaces of a sample container (302). Preferably, the tubular sidewall has first and second regions that are disposed relative to one another along the major axis of the tubular sidewall. Optionally, the tubular sidewall further includes a third region that is disposed along the major axis of the sidewall relative to the first and second regions, and that is configured to receive a cap.

Preferably, the material used to provide the sidewall is compatible with the fluids intended to be contained therein. Thus, if it is intended that the sidewall contain an organic solvent such as acetonitrile, polymers that dissolve or swell in acetonitrile would be unsuitable for use in forming the sidewall. Similarly, sidewalls intended to contain dimethyl sulfoxide (DMSO) preferably are compatible with DMSO. For water-based fluids, a number of materials are suitable for the construction of sidewalls and include, but are not limited to, ceramics such as silicon oxide and aluminum oxide, metals such as stainless steel and platinum, and polymers such as polyester and polytetrafluoroethylene. For fluids that are photosensitive, the sidewall may be constructed from an optically opaque material that has sufficient acoustic transparency for substantially unimpaired functioning of the device. The sidewall may be prepared using any suitable technique, such as molding, machining, casting, extruding, or three-dimensional printing. In some embodiments, such as those illustrated in FIGS. 2A-2B, the sidewall may be integrally formed with the bottom of the container. The bottom of the container may, for example, be substantially perpendicular to the major axis of the sidewall, and suitably may be configured to transmit an acoustic wave therethrough and into a fluid disposed within the second region. In other embodiments, such as illustrated in FIGS. 2C-2D, one or more caps suitably may be applied to the sidewall at a later time so as to form a partially or fully closed container that encloses fluid. As noted above, the sidewall may have any suitable cross-section. In some embodiments, the sidewall is generally cylindrical. For example, the sidewall may have a cross-section that is generally circular, and that optionally includes one or more flat portions so that the container suitably may be used in a horizontal configuration for acoustic ejection; cross-sections that have a circular portion and a flat portion may be considered to be "generally circular." Such a flat portion suitably may be configured to transmit an acoustic wave therethrough and into a fluid.

An identification mark then is embedded within the tubular sidewall at a plurality of sectors, each having a width, about the tubular sidewall within the first region (303). The identification mark preferably is machine readable by a reader viewing any arbitrary one or more of the sectors. In some embodiments, the identification mark is embedded by forming a machine-readable change in the texture of the tubular sidewall. In some embodiments, embedding the identification mark includes removing portions of the sidewall so as to define a change in texture, e.g., plurality of grooves in the sidewall, where the plurality of grooves define the identification mark, e.g., define a barcode. The change in texture, e.g., grooves, may be formed, for example, by removing small amounts of material from the container or by otherwise introducing machine-readable changes in the texture of the container's surface in accordance with a geometrical pattern. Such change in texture, e.g., grooves, may be formed using any suitable method, including but not limited to laser scribing, chemical etching, discoloring the surface such as with heating, burning, or radiation, or transferring adherent materials which may have the same color as the container or may have one or more different colors than the container. The change in texture, e.g., grooves, suitably may be defined in the inner surface of the container, or in the outer surface of the container, or both.

In some embodiments, the barcode is one-dimensional, and the grooves extend substantially perpendicularly to the major axis of the tubular sidewall, e.g., as illustrated in FIG. 1A. In other embodiments, the barcode is two-dimensional, and the grooves define a two-dimensional geometric pattern, such as described above with reference to FIG. 1C. In yet other embodiments, the identification mark is any other suitable geometric pattern that may be machine readable so as to identify the container.

Figure 3B:
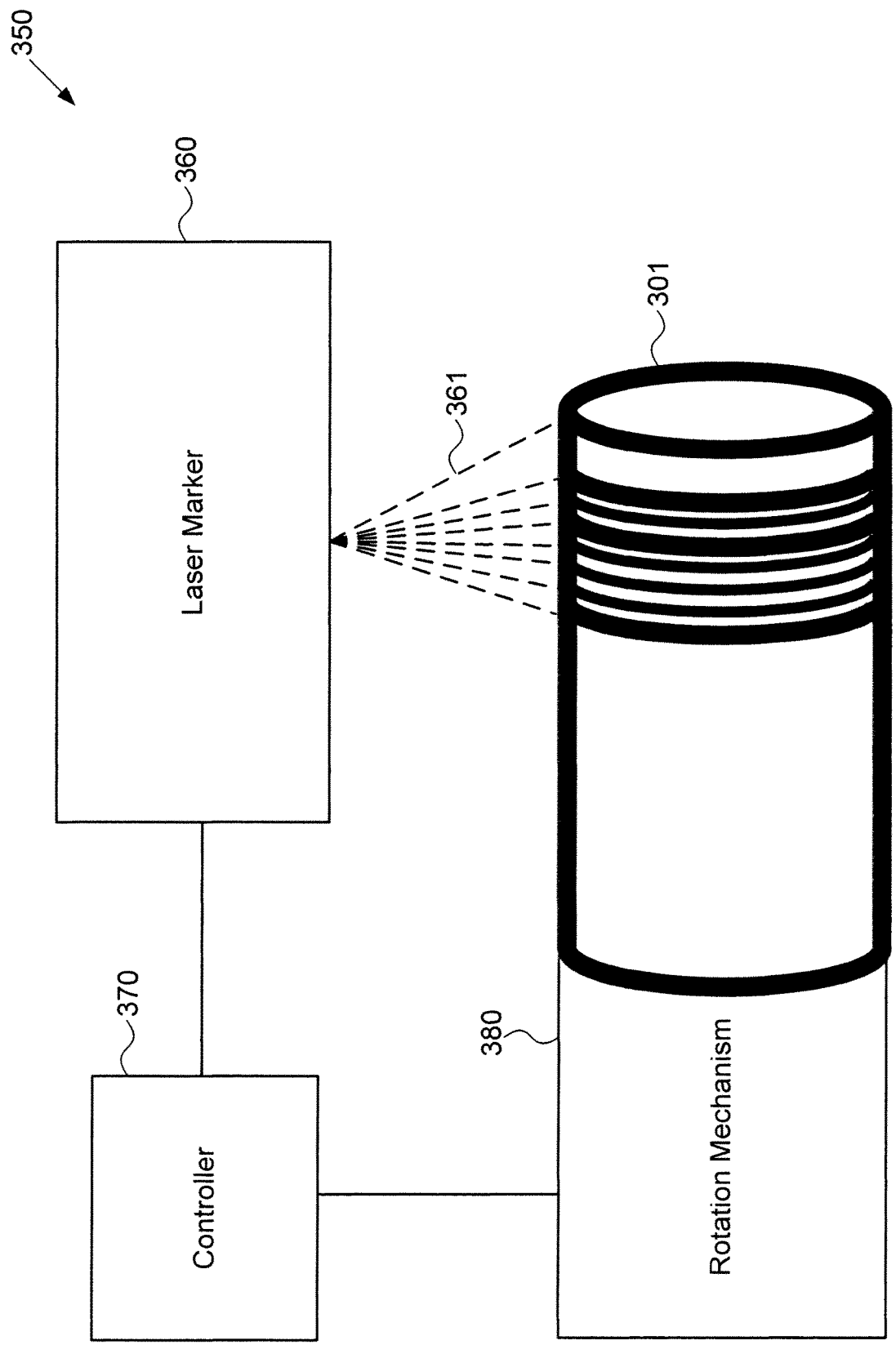
FIG. 3B is a simplified diagram of an exemplary system for embedding an identification mark within a sample container, according to an embodiment of the present invention.

FIG. 3B is a simplified diagram of an exemplary system 350 for embedding an identification mark within a sample container, according to an embodiment of the present invention. The illustrated system 350 includes laser marker 360, controller 370, and rotation mechanism 380, although it should be understood that other system configurations suitably may be used. Laser marker 360 is configured to irradiate sidewall 301 with one or more laser beams 361 that are configured to remove material from sidewall 301 in accordance with instructions from controller 370, e.g., to ablate portions of sidewall 301 so as to define a change in texture, e.g., grooves, having an appropriate geometric pattern. Controller 370 is configured to receive user instructions regarding the type of identification mark to be embedded within sidewall 301, e.g., the type of barcode, and suitably to instruct laser marker 360 to implement that type of identification mark. Controller 370 further may be configured to cause rotation mechanism 380, to which sidewall 301 may be coupled, to rotate sidewall 301 so as to remove material from the interior or exterior surface, or both, of sidewall 301 within multiple sectors about sidewall 301 and thus so as to define a change in texture, e.g., grooves, within such sectors. As noted above with reference to FIG. 1A, such sectors may be contiguous with one another, or, as noted above with reference to FIG. 1B, there may be discontinuities between one or more of such sectors. Such discontinuities may be formed by interrupting laser beams 361 at suitable times during rotation of sidewall 301. In some embodiments, controller 370 suitably controls laser marker 360 so as to dispose the identification mark only within a certain region of sidewall 301, e.g., only within a region that is spaced apart from a region in which acoustic energy traversal is to be used for droplet ejection, so as to inhibit interaction between the ejection acoustic wave and the identification mark.

Suitable laser markers and controllers that may be adapted for use in embedding identification marks within a sidewall are commercially available, such as the 3-Axis $YVO_4$ Laser Marker, MD-V9900A Series available from Keyence Corporation (Osaka, Japan). However, it should be understood that any suitable method for defining identification marks, e.g., defining a change in texture, e.g., defining grooves, within a sidewall may be used, and that such methods may, but need not necessarily, include removing material from the sidewall. For example, material may be added to the sidewall so as to define a change in texture, e.g., ridges having grooves therebetween, e.g., the ridges may be formed using laminating or three-dimensional printing, or even conventional printing methods for curved surfaces. Or, for example, the sidewall may be fabricated with the change in texture, e.g., grooves, integrated therein, so as to obviate the need for an additional step of material removal, e.g., the sidewall and grooves may be formed using molding or three-dimensional printing. It should be understood that methods other than laser marking suitably may be used to embed an identification mark within a container.

Figure 4C:
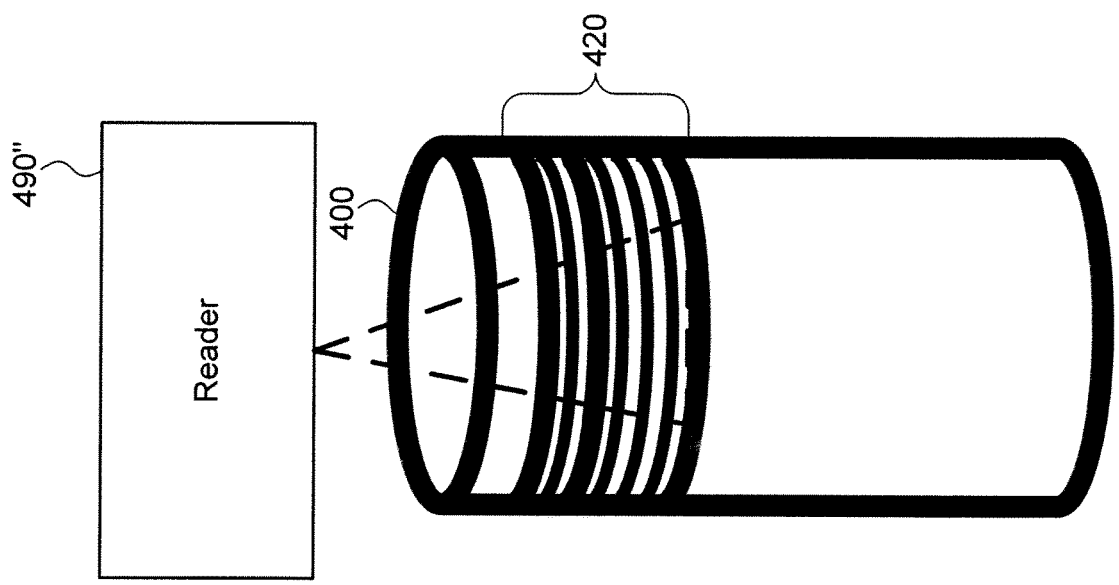

As noted above, embedded identification marks preferably are machine readable, and indeed may not be human readable. FIGS. 4A-4C are simplified diagrams showing sample containers having identification marks embedded therein together with a reader for reading the identification marks, according to some embodiments of the present invention. FIG. 4A illustrates an embodiment in which reader 490 scans one or more sectors of container 400 at an arbitrary rotational position within region 420 and finds an identification mark, which optionally may include an error correction code (ECC). Note that the identification mark may, for example, be disposed on the outer surface of container 400, in which case reader 490 may read the outside of container 400. In such embodiments, container 400 suitably may be either opaque or may be at least partially transparent to the wavelength to be used to read the identification mark; such wavelength may be within the human-visible range, or may be outside of the human-visible range, e.g., may include a wavelength in the ultraviolet, near-infrared, or far-infrared range. Alternatively, the identification mark may, for example, be disposed on the inner surface of container 400, in which case reader 490 may read the inside of container 400. In such embodiments, container 400 preferably is at least partially transparent. As yet another alternative, the identification mark may, for example, be disposed on both the inner and outer surfaces of container 400, in which case reader 490 may read both the inside and outside of container 400. In such embodiments, container 400 preferably is at least partially transparent.

FIG. 4B illustrates an alternative embodiment in which alternative reader 490' scans two arbitrary sectors of container 400 within region 420, in which one sector is at least partially visible, as in FIG. 4A, and the other is at least partially obscured by a discontinuity, e.g., by supplementary label 421 affixed to the exterior surface of the container. The identification mark preferably is machine readable by reader 490' viewing the label and by viewing any arbitrary one or more of the sectors that is not obscured by the label. The label and the one or more of the sectors may be separated from one another by about 10% or less of a circumference of the exterior surface of the container, e.g., about 5% or less of a circumference of the exterior surface of the container, e.g., about 2% or less of a circumference of the exterior surface of the container. As in FIG. 4A, reader 490' may read the inside and/or outside surfaces of container 400', and container 400' may be at least partially transparent as appropriate, so as to facilitate reading the inside surface of the container. Note that reader 490' may include a single reader configured to scan multiple sectors or portions thereof, or alternatively may include multiple readers, each configured to scan a corresponding sector or portion thereof, e.g., may include two readers.

FIG. 4C illustrates another alternative embodiment in which alternative reader 490" performs a glancing-angle scan of one or more sectors of container 400 at an arbitrary rotational position within region 420 and finds the identification mark and optional ECC. As in FIG. 4A, reader 490" may read the inside and/or outside surfaces of container 400', and container 400' may be at least partially transparent as appropriate, so as to facilitate reading the inside surface of the container. Additionally, as in FIG. 4A, reader 490" may include a single reader configured to scan one sector or a portion thereof, or as in FIG. 4B, may include a single reader configured to read multiple sectors or portions thereof or may include multiple readers, each configured to scan a corresponding sector or portion thereof, e.g., two readers.

Suitable readers that may be adapted for use in reading embedding identification marks within a container are commercially available, such as the High Performance 2D Code Reader, SR-D100 Series available from Keyence Corporation (Osaka, Japan). According to the manufacturer, the SR-D100 reader has an ultra high resolution mode in which it may read bar code features, also referred to as cells, having a size of 25 µm or more, with a focal distance of 40 mm. From a simplified point of view, the SR-D100 reader includes a camera with macro lens in front of it. If the camera's field of view is curved or tilted, as may be the case when viewing embedded identification marks from direct perspective such as respectively illustrated in FIGS. 4A-4B or from a glancing-angle perspective such as illustrated in FIG. 4C, distortions in the view may be compensated for by stopping down the camera, which may increase the exposure time.

In one illustrative embodiment, a 15 digit code is expressed as a two-dimensional bar code with 15×15 cells and a 25 µm cell size, corresponding to the resolution of the SR-D100HA model reader, yielding an identification mark that is approximately a 0.375 mm×0.375 mm square. If that code is printed on a tubular sidewall having a 3.5 mm outer diameter that is on the optical axis of the reader, the difference in focus distance is approximately 10 µm from one edge of the identification mark to the center. If the tubular sidewall is rotated such that the optical axis is on the edge of the identification mark, the other edge is only 41 µm further away from the reader, which may be less compared to the offset caused by the tilt angle needed to be able to read the code off of sidewalls in a carrier, e.g., such as the sidewalls of containers 500 disposed within carrier 590 illustrated in FIG. 5 and described in greater detail below. If the edge of the identification mark is located 1 mm from the top of the sidewall and the reader is reading codes along the diagonals of the carrier, this leaves approximately 2.8 mm of distance between near walls of adjacent tubes which corresponds to approximately 20 degrees. Reading through the far wall, the corresponding tilt angle is about half of that.

To calculate the minimum amount of tilt at which a reader may be able to read an identification mark, first the Numerical Aperture (NA) needed to obtain a diffraction limited spot size that correlates with the cell size is calculated. Then it is determined whether the tilt must be increased to inhibit clipping the NA. Continuing with the illustrative embodiment above, with a 25 µm minimum cell size, assume that the objective has a diffraction limit of 5 µm. That means the Numerical Aperture of the objective must be at least 0.16 ($NA=1.22\lambda/d$, where $\lambda=650$ nm and $d=5$ µm), corresponding to an F number of 3.1. That corresponds to a half angle of the cone of light of asin(0.16) which is approximately 10 degrees. Thus, clearing the mechanical obstruction also guarantees that we can get diffraction limited imaging. The worst case focal shift due to the 20 degree tilt will be approximately 0.13 mm. The SR-D100HA has a field of view of 5.5×3.5 mm which matches the aspect ratio of a 752×480 pixel sensor with 6 µm pixels (from Aptina Imaging Corporation, San Jose, Calif.), yielding a magnification of 0.8. To calculate the expected depth of field for the worst case F number of 3.1, these numbers may be used in the standard formula for depth of field for close up imaging, $DOF \approx 2Fc(m+1)/m$ where c=diameter of circle of confusion (e.g., 12.5 µm) and m is the magnification, yielding a depth of field of approximately 0.2 mm. Accordingly, it appears that for relatively small identification marks, tilt and curvature substantially are not anticipated to affect the potential for reading the identification mark. It should be appreciated that the above equations and calculations are merely exemplary, and should not be construed as limiting in any way.

Figure 5:
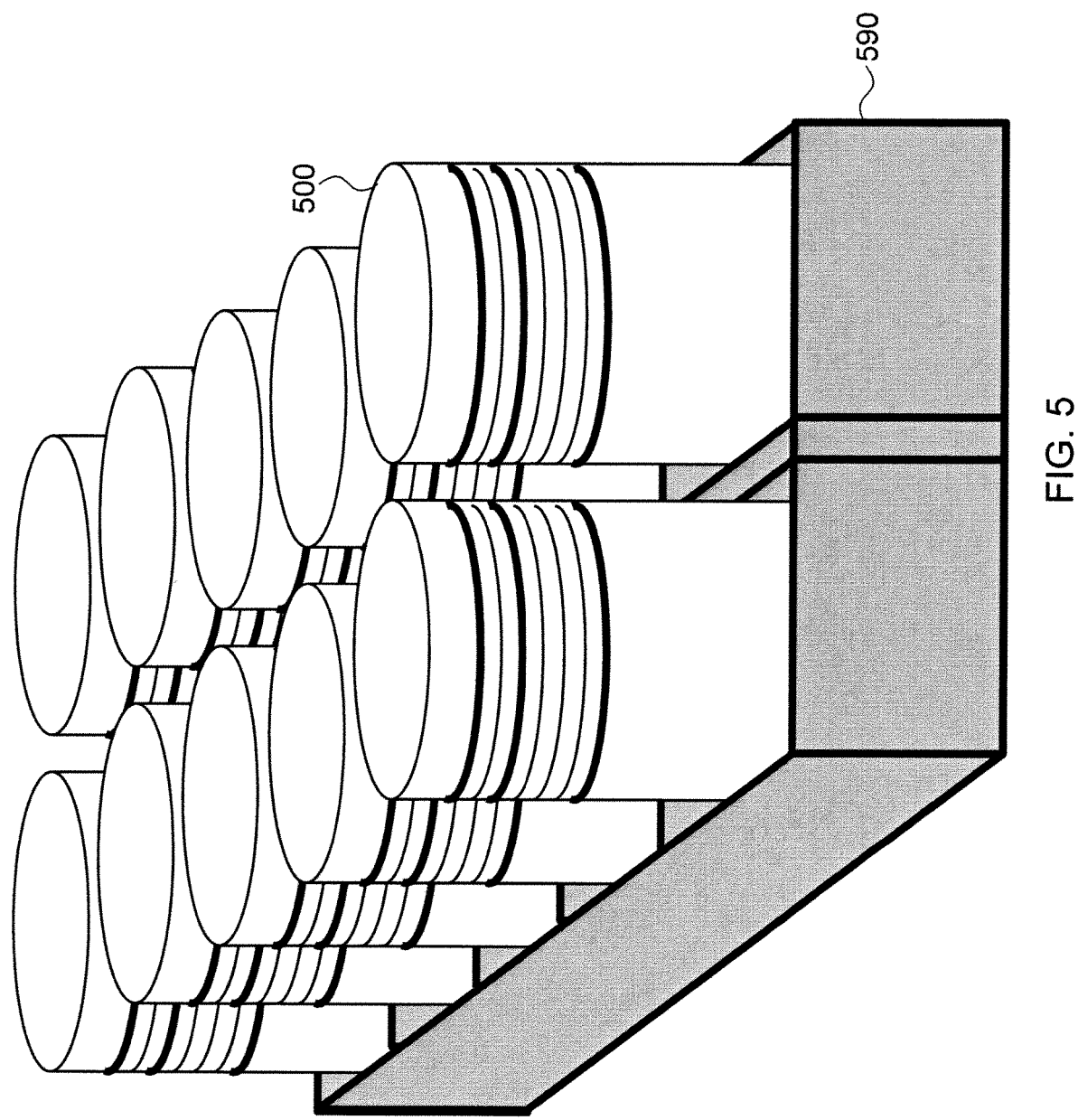
FIG. 5 is a simplified diagram showing multiple sample containers in a rack, according to an embodiment of the present invention.

FIG. 5 is a simplified diagram showing multiple single-reservoir containers 500 having identification marks embedded therein, held as a collection in rack 590. Preferably, each container has an arbitrary rotational orientation with each presenting complete, readable identification information to a reading device according to one embodiment of the present invention. In some embodiments, the identification marks substantially are configured so as not to be obscured by rack 590, e.g., are disposed at a spaced distance from portions of containers 500 that are expected to be disposed within, and thus obscured by, rack 590. For example, as noted above with reference to FIGS. 1A-1C, the identification marks may be disposed only within regions 120, 120', or 120". Alternatively, for embodiments in which containers 500 are to be read using glancing-angle scanning such as illustrated in FIG. 4C, the identification marks suitably may be embedded within regions that are disposed within rack 590, because the glancing-angle scan may read the identification marks from a perspective at which rack 590 does not obscure the identification marks.

Rack 590 may have any suitable configuration. For example, rack 590 may have an fully open bottom, permitting the bottoms of containers 500 to be fully exposed, or alternatively may have a partially open bottom, permitting the bottoms of containers to be partially exposed, or alternatively may have a closed bottom. For embodiments in which containers 500 will be used in a vertical orientation with an acoustic ejector such as described above with reference to FIG. 2A, rack 590 preferably has a fully or partially open bottom so as to facilitate transmission of acoustic energy from the acoustic ejector into containers 500. So as to facilitate handling of multiple containers, containers 500 preferably are substantially acoustically indistinguishable from one another, and uniquely identifiable from one another by machine reading identification marks respectively embedded therein.

Additionally, rack 590 further may be configured so as to receive any suitable number and arrangement of containers 500. For example, commercially available racks may accommodate an array of 96, 384, 1536, or 3456 containers, although racks accommodating more or fewer containers suitably may be used. Manufacturers of suitable racks include Thermo Fisher Scientific (Hudson, N.H.) and Brooks Automation, Inc. (Chelmsford, Mass.). In addition, to reduce the amount of movement and time needed to align the acoustic ejector with each container during operation, it is preferable that the center of each container be located not more than about 1 centimeter, e.g., not more than about 1.5 millimeters, e.g., not more than about 1 millimeter, e.g., not more than about 0.5 millimeter, from a neighboring container center. These dimensions tend to limit the size of the containers to a maximum volume. For example, containers 500 may be constructed to contain no more than about 1 mL, e.g., no more than about 200 µL, e.g., no more than about 10 µL, e.g., no more than about 1 µL of fluid. Note that because of their relatively small size, containers of such volumes, e.g., volumes of 10 µL or less, or 1 µL or less, may not suitably be labeled using conventional labels, e.g., paper and adhesive based labels. Such conventional containers therefore may be identified by placing them into a known position within a rack that is conventionally labeled. However, following their use at that position, and removal from that position, the containers may not suitably be reused because they are no longer identifiable relative to one another. Accordingly, such containers conventionally then are discarded. In comparison, the present containers having identifying marks embedded therein suitably may be reused any appropriate number of times, e.g., may be removed from rack 590, suitably stored, and retrieved for further use any appropriate number of times. As such, the present containers having identifying marks embedded therein may facilitate repeated uses of fluids therein that otherwise may have been discarded. Additionally, even if it is practicable to apply a paper-based label to a conventional container, such a label may not be as durable as are the present identification marks; additionally, such a label may interfere with acoustic ejection from the container, particularly if the label is applied to the bottom of the container.

When rack 590 is configured to store an array of containers 500, such as illustrated in FIG. 5, each container may be individually, efficiently, and systematically addressed. Although any type of array may be employed, arrays that include parallel rows of evenly spaced containers are preferred. Typically, though not necessarily, each row contains the same number of containers. For example, rectilinear arrays that include X rows and Y columns of containers may be used, wherein X and Y are each at least 2. In some instances, X may be greater than, equal to, or less than Y. In addition, nonrectilinear arrays as well as other geometries may be employed. For example, hexagonal, spiral and other types of arrays may be used as well. In some instances, rack 590 may be configured to accommodate an irregular pattern of containers.

It should be apparent that the present containers with identification marks therein suitably may be used in any appropriate application. For example, although the present containers have been described as being configured for compatibility with acoustic ejection, it should be understood that the containers alternatively may be configured for compatibility with any other suitable fluid storage or analysis technique, including micropipetting, pin spotting, inkjet printing, and the like. Indeed, the present containers with identification marks therein suitably may be used to store any item or material.

Under one non-limiting aspect of the present invention, a container includes a tubular sidewall defining interior and exterior surfaces of the container. The tubular sidewall includes first and second regions disposed relative to one another along a major axis of the tubular sidewall. The container further may include an identification mark embedded within the tubular sidewall at a plurality of sectors about the tubular sidewall within the first region. Each sector has a width, and the identification mark may be machine readable by a reader viewing any arbitrary one or more of the sectors. Illustratively, such a container is described above with reference to FIGS. 1A, 1B, 1C, 2A, 2B, 2C, 2D, 3B, 4A, 4B, 4C, and 5.

In some embodiments, the identification mark includes a plurality of grooves defined in the sidewall, the plurality of grooves defining a barcode. For example, the barcode may include a one-dimensional barcode, and the grooves may extend substantially perpendicularly to the major axis of the tubular sidewall. Or, for example, the barcode may include a two-dimensional barcode, and the grooves may define a two-dimensional geometric pattern. The plurality of grooves may be defined in the inner surface of the container. Or, the plurality of grooves may be defined in the outer surface of the container.

In some embodiments, the identification mark includes a machine-readable change in a texture of the tubular sidewall in accordance with a geometrical pattern. For example, the machine-readable change in the texture can be formed using one or more of laser scribing, chemical etching, heating, burning, radiation, or transferring an adherent material. In some embodiments, the adherent material has the same color as the tubular sidewall. In some embodiments, the adherent material has a different color as the tubular sidewall.

In some embodiments, the identification mark defines a barcode. For example, the barcode can include a one-dimensional barcode. Or, for example, the barcode can include a two-dimensional barcode.

In some embodiments, the container further includes a substantially flat bottom oriented substantially perpendicular to the major axis of the tubular sidewall, the substantially flat bottom being configured to receive an acoustic wave and to transmit the acoustic wave to a fluid disposed within the second region.

In some embodiments, a portion of the tubular sidewall in the second region is substantially flat along the major axis of the tubular sidewall, the substantially flat portion being configured to receive an acoustic wave and to transmit the acoustic wave to a fluid disposed within the second region.

In some embodiments, the identification mark substantially is disposed only within the first region.

In some embodiments, the tubular sidewall includes a third region disposed along the major axis of the tubular sidewall relative to the first and second regions, the third region being configured to receive a cap.

In some embodiments, the identification mark is embedded within one of the interior and exterior surfaces of the container, and the width of each sector is about 10% or less of a circumference of the one of the interior and exterior surfaces of the container.

In some embodiments, a plurality of the sectors are contiguous with one another.

Some embodiments further include a label affixed to the exterior surface of the container, the label obscuring at least one of the sectors. The label obscures at least one of the sectors. The identification mark is machine readable by the reader viewing the label and by viewing any arbitrary one or more of the sectors that is not obscured by the label, the label and the one or more of the sectors being separated from one another by about 5% or less of a circumference of the exterior surface of the container.

Under another non-limiting aspect of the present invention, a method for preparing a container includes providing a tubular sidewall defining interior and exterior surfaces of the container, the tubular sidewall having first and second regions disposed relative to one another along a major axis of the tubular sidewall. The method further may include embedding an identification mark within the tubular sidewall at a plurality of sectors about the tubular sidewall within the first region, each sector having a width, the identification mark being machine readable by a reader viewing any arbitrary one or more of the sectors. Illustratively, such a method is described above with reference to FIGS. 3A and 3B. Illustratively, such a container is described above with reference to FIGS. 1A, 1B, 1C, 2A, 2B, 2C, 2D, 3B, 4A, 4B, 4C, and 5.

All patents, patent applications, and publications mentioned herein are hereby incorporated by reference in their entireties for all purposes. However, where a patent, patent application, or publication containing one or more express definitions is incorporated by reference, those express definitions should be understood to apply to the incorporated patent, patent application, or publication in which the one or more express definitions are found, but not to the remainder of the text of this application, in particular not to the claims of this application.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed:

1. A container adapted for acoustic ejection of a fluid, the container comprising:

a tubular sidewall defining an interior side surface and an exterior side surface of the container, the tubular sidewall including a first region, a second region and a third region, the second region being located between the first region and the third region, the first region being adjacent to the second region, the second region being adjacent to the third region;

an opening;

a substantially flat surface located in the first region of the tubular sidewall, the substantially flat surface extending along a major axis of the tubular sidewall, the substantially flat surface being configured to be coupled to an acoustic transducer so as to receive an acoustic wave generated by the acoustic transducer and to transmit the acoustic wave into the fluid so as to acoustically eject a droplet of the fluid out of the opening from a surface of the fluid opposite the substantially flat surface;

an identification mark located in the second region but not in the first region of the tubular sidewall and not in the third region of the tubular sidewall, the identification mark including a barcode defined by grooves and ridges that are raised relative to the grooves, at least some of the ridges being spaced apart from one another by the grooves, the grooves and the ridges being embedded within the tubular sidewall at a plurality of sectors circumferentially distributed about the entire tubular sidewall, the plurality of sectors being located within the second region but not within the first region of the tubular sidewall and not within the third region of the tubular sidewall, each sector of the plurality of sectors having a width and having the identification mark embedded therein, different sectors of the plurality of sectors having the same identification mark embedded therein, the identification mark being machine readable by a reader viewing any arbitrary circumferential portion of the second region of the tubular sidewall; and a label affixed to the exterior side surface of the container, the label obscuring at least one sector of the plurality of sectors within the second region, the identification mark being machine readable by a reader viewing the label and by viewing any arbitrary one or more sectors of the plurality of sectors that are not obscured by the label, the label and the one or more sectors being separated from one another by about 5% or less of a circumference of the exterior side surface of the container;

wherein:

the grooves and the ridges are located within the second region but not within the first region of the tubular sidewall and not within the third region of the tubular sidewall;

the grooves and the ridges each are contiguous and unitary with the tubular sidewall;

the grooves and the ridges are defined in the inner side surface of the tubular sidewall;

the grooves and the ridges each have approximately same two or more optical properties as the tubular sidewall and one another;

the grooves and the ridges are configured substantially not to interfere with transmission of the acoustic wave into the fluid; and the grooves and the ridges are formed using molding or three-dimensional printing.

\* \* \* \* \*